Nov. 10, 1970  H. B. HALLSWORTH  3,538,586
BOX CLOSING APPARATUS
Filed May 28, 1968  5 Sheets-Sheet 4

INVENTOR
Henry B. Hallsworth
BY
Kenway, Jenney & Hildreth
ATTORNEY

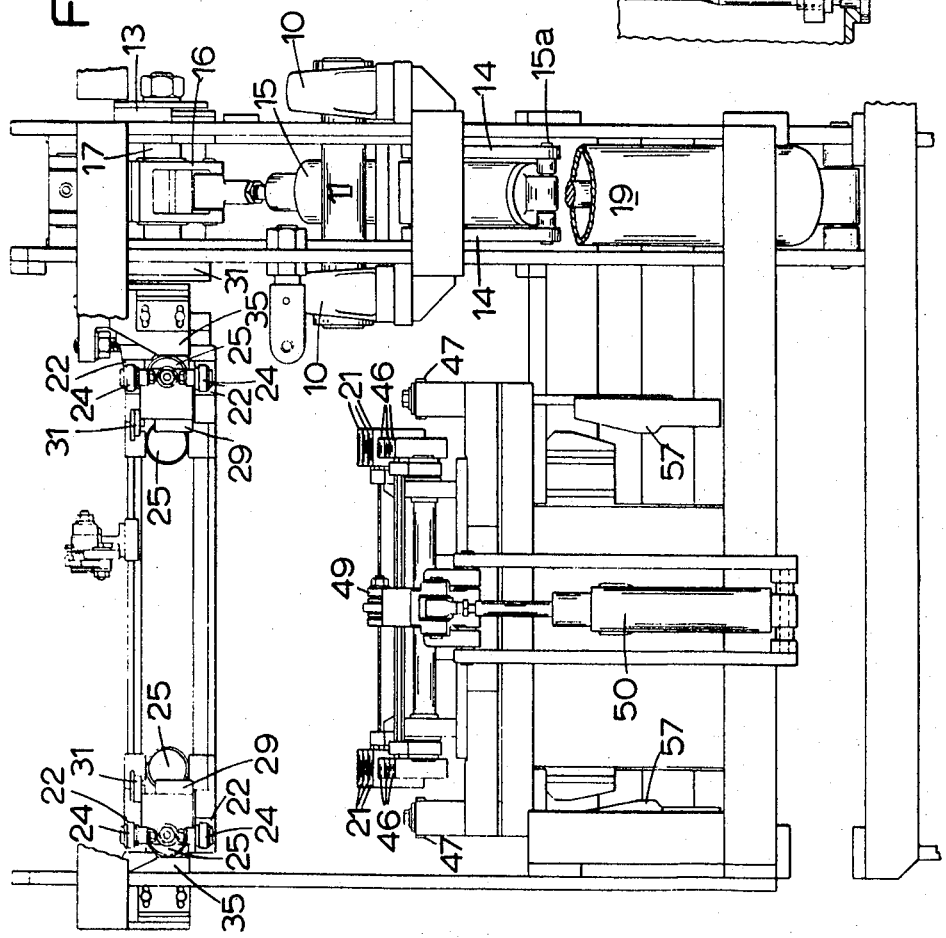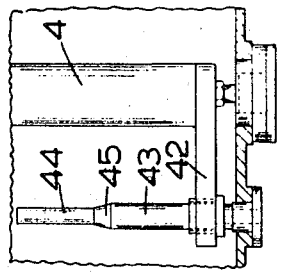

United States Patent Office 3,538,586
Patented Nov. 10, 1970

3,538,586
BOX CLOSING APPARATUS
Henry B. Hallsworth, Walsall, England, assignor to Rubery Owen & Company Limited, Darlaston Wednesbury, England, a corporation of Great Britain and Northern Ireland
Filed May 28, 1968, Ser. No. 732,683
Claims priority, application Great Britain, May 30, 1967, 24,816/67; Oct. 10, 1967, 46,162/67
Int. Cl. B23p 19/04
U.S. Cl. 29—208
13 Claims

ABSTRACT OF THE DISCLOSURE

Apparatus for closing together two boxes such as mould box halves, with the upper and lower boxes arriving alternately in a continuous stream. A first box carrier is positioned to receive a first box and to facilitate receiving of the box movable laterally to a limited extent. The carrier is mounted on means adapted to raise and invert the box on receipt of a box in the carrier. A second box arrives in a second carrier below the raised first box and the second carrier is then raised to close the boxes together. Location means accurately locate the boxes together.

BACKGROUND AND BRIEF DESCRIPTION OF THE INVENTION

The invention is concerned with the problem of providing apparatus to automatically close together boxes such as mould box halves in a machine in which the mould box halves flow in a continuous stream.

This invention has reference to apparatus primarily but not exclusively for use in conjunction with automatic moulding machines and is concerned particularly with automatic moulding machines in which the mould is prepared in half moulding boxes.

A primary object of the invention is to provide apparatus for automatically closing the complementary moulding box halves preparator to casting or for bringing together two components where the accurate and automatic assembly of the two component parts is required, for example the assembly of internal combustion engine cylinder blocks for heads. For the purpose of describing and defining this invention, the term 'box' is used but this term is employed in the specification and claims as extending to include any box, component or the like which is required to be assembled to another box, component or the like.

According to the present invention apparatus for closing together first and second boxes as defined herein, comprises a framework a first carrier movable relative to the framework by first power operated means, the first carrier being so formed and supported in such a way as to permit the carrier to align itself with an on-coming first box so as to receive the first box, means actuated by the first box when it is received in the carrier to cause the first power operated means to lift the first carrier, and the box carried thereby, and rotate them so as to invert the box, a second carrier so formed and supported in such a way as to permit the second carrier to align itself with an on-coming second box after the first carrier has received and removed a first box, removable stop means defining a received position of the second box in the second carrier, means actuated by the second box when it is received in the second carrier to cause a second power operated means to lift the second carrier to close the lower box on the upper box, and means to locate the boxes relatively to each other as they are closed together.

The first carrier may be supported in a frame movable by the first power operated means, in such a manner that the first carrier can move laterally to align itself with an on-coming first box.

The second carrier may be supported by a platform movable by the second power operated means in such a manner that the second carrier can move laterally to align itself with an on-coming second box.

The first power operated means may comprise two successively operable actuators, one to rotate the first box and first carrier from a generally horizontal to a generally upright position and the second to rotate the first box and its carrier from a generally upright position to a generally inverted position.

An embodiment of the invention will now be described by way of example only with reference to the accompanying drawings in which:

FIG. 5 is a front elevation of the apparatus shown in FIG. 3, with the frame 18 raised and inverted; and FIG. 6 is a sectional front elevation of part of the apparatus, showing a detail.

This embodiment of the invention is used in conjunction with apparatus adapted to receive a stream of upper and lower moulding box halves and segregate them into alternate upper and lower moulding box halves.

Although the invention may be used with a variety of boxes, as defined herein, this embodiment relates to and is described exclusively with reference to apparatus for closing an upper half moulding box (a first box) with respect to a lower half moulding box (a second box).

Figure 1:
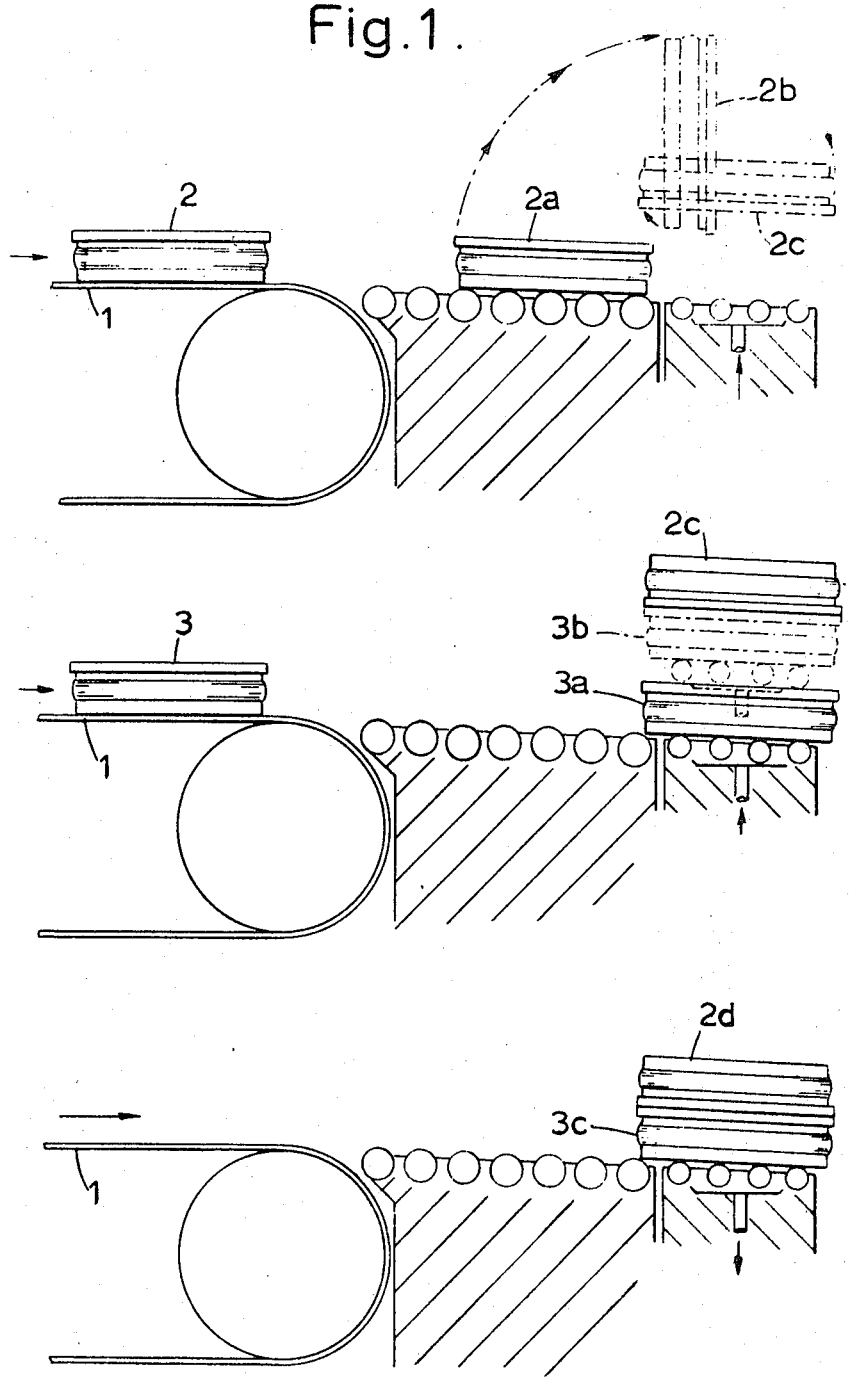
FIG. 1 is a series of schematic views of apparatus according to the invention showing in sequence the basic movements of the two boxes required to close the boxes together.

FIG. 1 shows a conveyor 1 along which a series of half moulding boxes are conveyed. These boxes are alternately upper and lower half moulding boxes. A first upper half moulding box 2 arrives at the end of the conveyor and travels in a horizontal position into the apparatus according to the invention as shown at 2a. It is then rotated through approximately 90° to an upright position shown at 2b; this rotation occurs about a position near one end of the box so that the box is raised as it is rotated. The box is then rotated through a further angle of about 90° to an inverted position 2c.

Thereafter a second box 3 arrives from the conveyor at position 3a, directly below position 2c of the box 2. The box 3 is then raised to position 3b immediately below position 2c, so that the two boxes are closed together. The two boxes are then lowered together to positions 3c, 2d and then are conveyed away together while a further pair of boxes 2 and 3 are closed together in the apparatus. The apparatus which performs these functions will now be described with reference to FIGS. 2 to 6 of the accompanying drawings.

Figure 2:
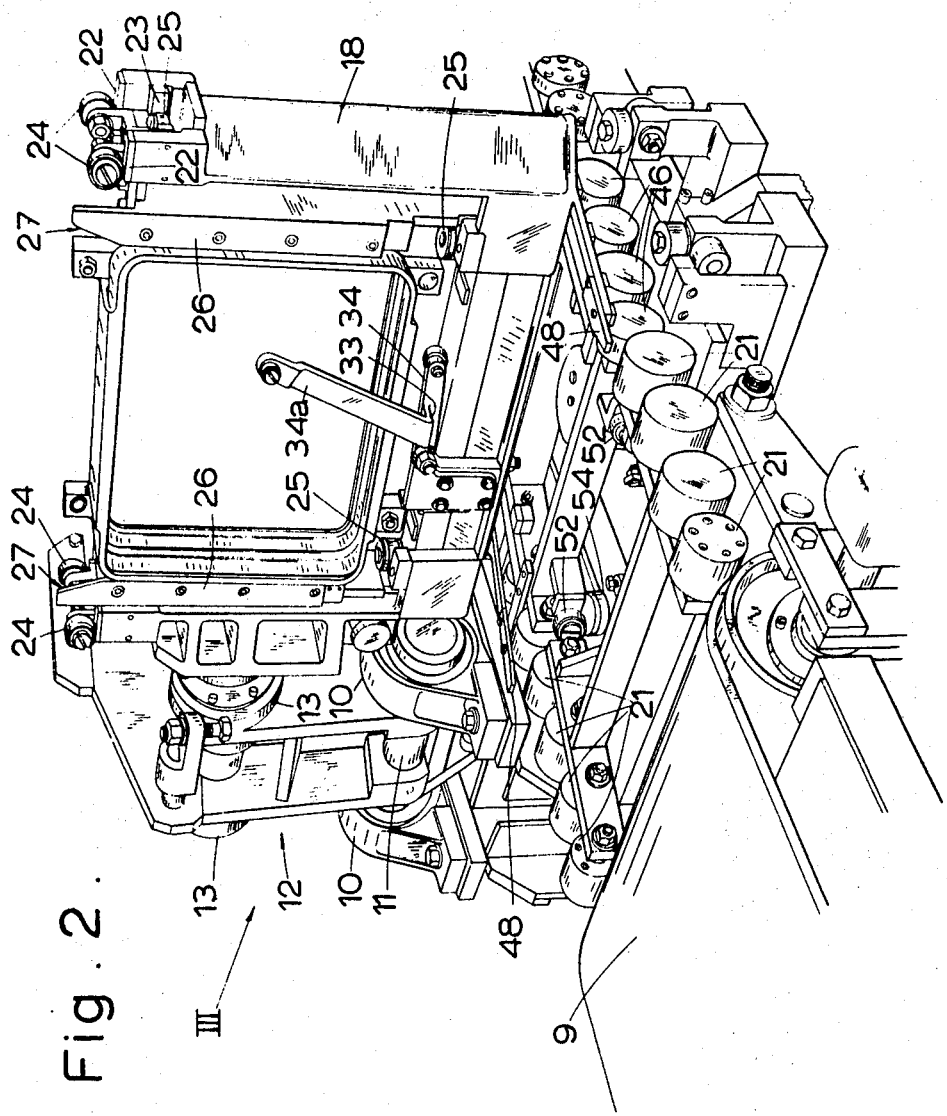
FIG. 2 is a perspective view of apparatus according to the invention.
Figure 3:
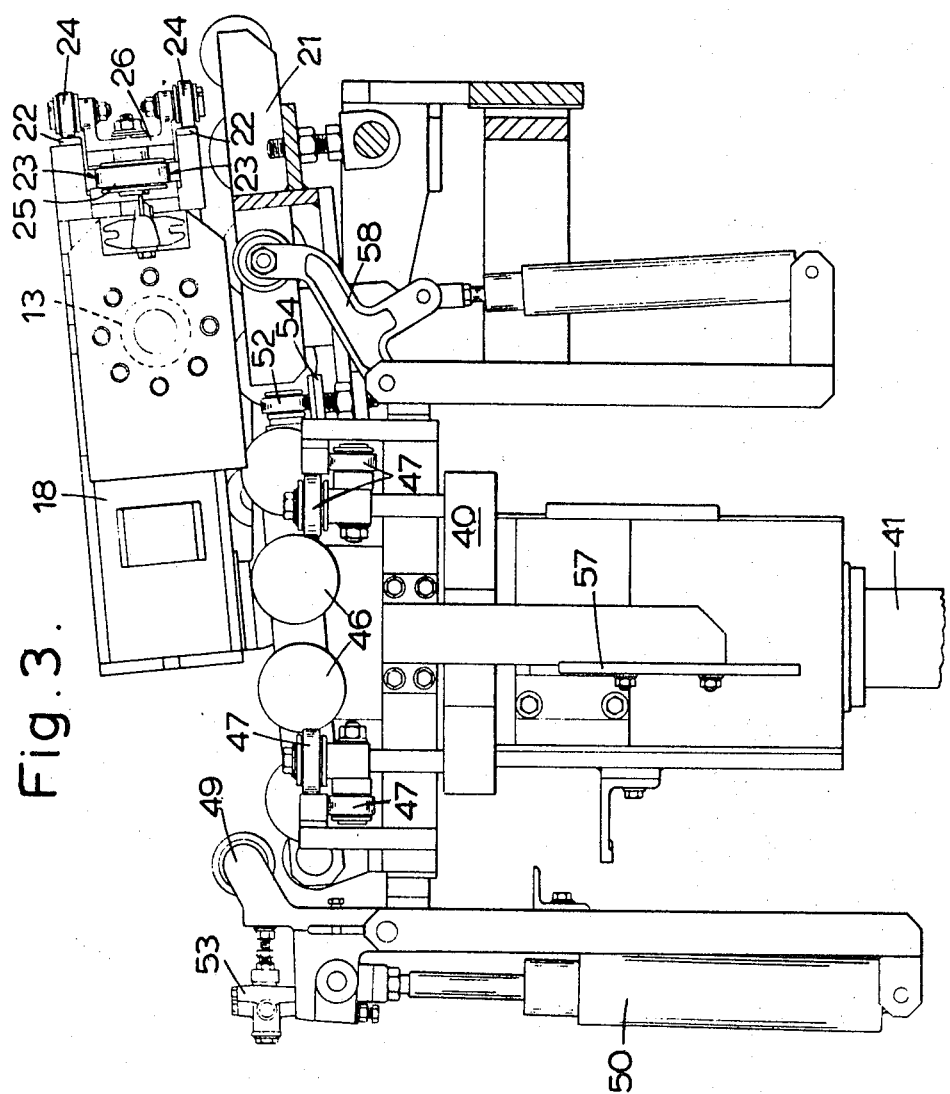
FIG. 3 is a part sectional side elevation of the apparatus of FIG. 1 in the direction of arrow III of FIG. 2.
Figure 4:
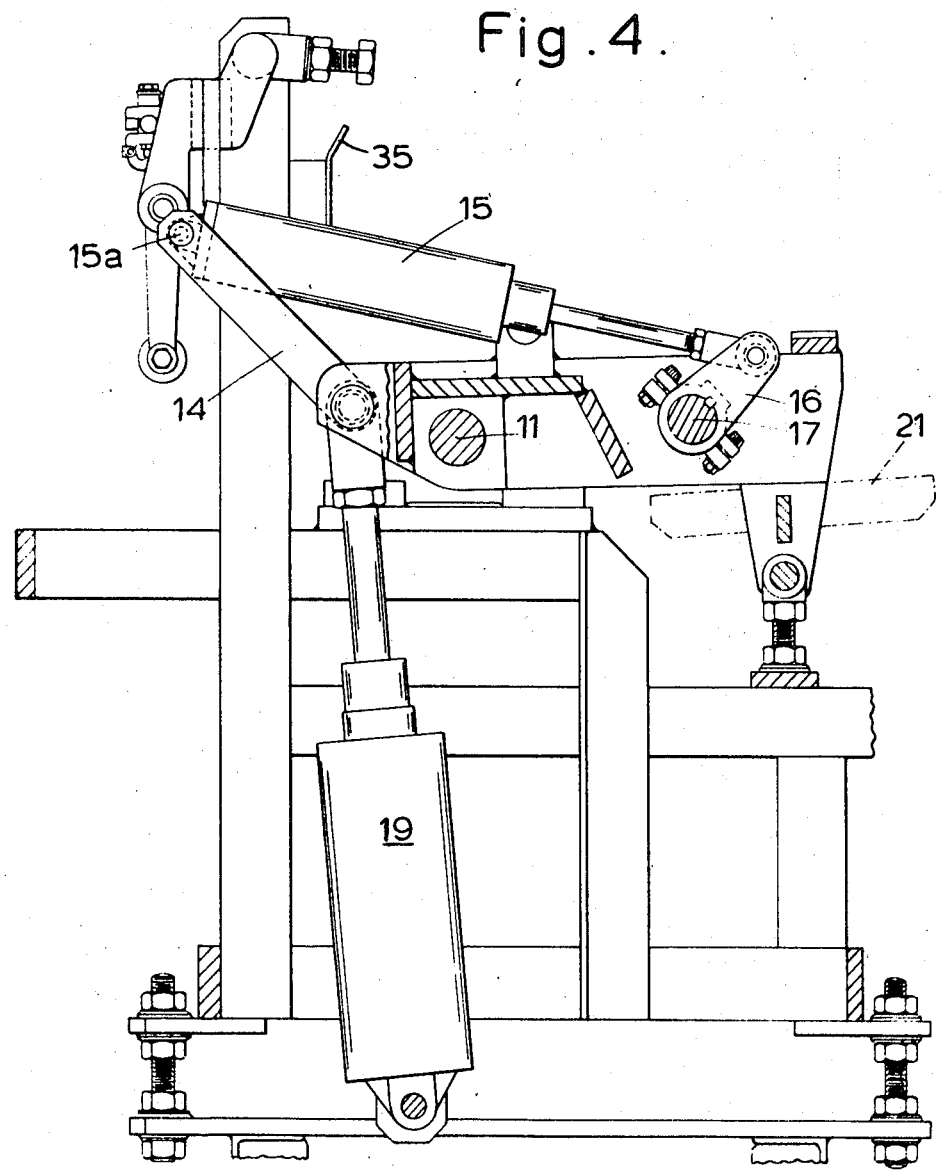
FIG. 4 is another part sectional side elevation showing details of the first power operated means for moving the first carrier.

According to FIGS. 2 to 6 there is aligned with a conveyor 9 which conveys alternate upper and lower (i.e. first and second respectively) half moulding boxes, apparatus comprising a metal framework including on one side a pair of substantial bearings 10 between which is mounted a substantial rigid arm 12 on a shaft 11 towards one end of which arm a further pair of substantial bearings 13 is carried. The arm 12 at the end thereof remote from the second pair of bearings 13 has one end of a link 14 (FIG. 4) pivotally connected thereto. A pneumatic ram 15 is pivotally connected between a pin 15a at the other end of the link and a crank arm 16 on a shaft 17 passing through the second pair of bearings 13 and which carries a generally U shaped frame 18 which is arranged generally in line with the conveyor. A second pneumatic ram 19 is connected between the link 14 at its connection to the arm 12 and the framework. The arrangement is such that the operation of the second ram 19 rotates the assembly of the arm, link and the first ram about the framework to rotate the U shaped frame 18 from a generally horizontal position to a generally vertical position as shown in FIG. 2 and operation of the first ram 15 then rotates the frame relative to the arm through approximately a further 90° so that the frame takes up an inverted and elevated position as shown in FIG. 5. The rams 15 and 19 and associated linkage form a first power operated means.

A short length of roller conveyor 21 is provided to receive the moulding boxes from the first mentioned conveyor 9 which may be of the belt type. The roller conveyor 21 is inclined downwards and forms part of a gravity conveyor system for the input to and discharge of moulding boxes from the present apparatus. The U shaped frame 18 which is initially horizontal with its open end directed towards the conveyor is provided with bearing surfaces 22, 23 for engaging rotatably mounted rollers 24, 25 carried by an upper half moulding box carrier 26 such that the carrier is carried by the frame 18 but is free to move transversely within predetermined limits thereon. A tapered guide surface 27 is provided at each side of the carrier 26 at the entry or conveyor end to assist alignment of the carrier with a moulding box delivered onto the roller conveyor. The moulding box is provided on each side with the usual outwardly projecting lugs (not shown), and upper and lower support pads 29 and 31 are provided on the carrier which are aligned with and straddle the moulding box lugs, when the box is fully received in the carrier 26. The moulding box is conveniently located by an end stop in the form of a roller 32 carried by the frame 18.

A bell crank lever 33 is rotatably mounted on the frame and one arm 34 of the lever is biassed, as by a spring, into the path of a box entering the carrier. The other arm is adapted, on rotation of the lever by a box entering the carrier, to operate a pilot valve (not shown) to cause the raising to its operative position of a removable stop means 49, to which further reference will be made, and to cause admission of pressure fluid to the second pneumatic ram 19 so as to lift the frame into the vertical position as has been described. The completion of this movement actuates a further pilot valve (not shown) to cause admission of pressure fluid to the first mentioned pneumatic ram 15, so as to rotate the frame, the carrier and the upper half moulding box into its inverted and elevated position as shown in FIG. 6 i.e. with the joint face downwards and the open end of the frame directed away from the conveyor 9. During the final movement of the frame the carrier 26 is traversed laterally relative to the framework by cam plates 35 mounted thereon, one or other of which is engaged by one of the rollers 25 on the carrier, so that the carrier is in position within limits defined by the cam plates.

A third pneumatic ram 41 (FIG. 3) is arranged vertically below the inverted molding box and acts between the framework and a platform 40. This ram constitutes the second power operated means. The cylinder of the third pneumatic ram 41 has a generally horizontal member 42 (FIG. 6) secured to it, which member is slidable up and down an upstanding guide post 43 which is fixed relative to the framework. The guide post has at its upper end a short cylindrical portion 44 of reduced diameter which continues downwardly in a frusto-conical section 45 which in turn merges into the main cylindrical section of the guide post 43. The arrangement is such that the cylinder is restrained from rotating during extension of the ram until the member 42 reaches and passes beyond the frusto-conical section 45 whereupon a limited amount of rotation of the cylinder is permitted allowing correction of a small amount of relative twist between a second half mould box supported on the platform 40 and the first half box held in the carrier 26 during final location and closure. The platform 40 carries a short section of roller conveyor 46 which in its lowered position forms part of a gravity roller conveyor through the present apparatus. Sets of rollers 47 are rotatably carried by the platform 40 such that the roller conveyor 46 forms a second carrier which is adapted to receive the lower half moulding box and which is free to move transversely on the platform 40 within predetermined limits. The second carrier is also provided with tapered guides 48 at the entry thereto to assist its alignment with a lower half moulding box and discharged onto the roller conveyor. The lower half moulding box proceeds over the roller conveyor 21 onto the roller conveyor 46 within the guides 48 provided on the carrier. Its limit of forward movement is defined by the aforementioned removable stop means 49, conveniently in the form of a roller mounted on an arm which can be raised and lowered by a pneumatic ram 50 mounted on the platform, conveniently the arm may be provided with a limited amount of lost motion so that when the box strikes the roller the arm moves a small amount to actuate a pilot valve 53 to cause admission of pressure fluid to the platform elevating ram 41.

The removable stop means 49 may be located or adjusted to stop the lower half moulding box slightly in advance of the upper half moulding box when the latter is in its raised and inverted position. This will ensure that the lower half moulding box will move backwards on the roller conveyor 46 during final location and closure and ensure against a situation arising in which the final location and closure cannot be attained without either a forward movement of the lower half box and/or a rearward movement of the upper half box, both of which movements will be resisted by stops.

The action of the stop means 49 can be best explained with reference to FIG. 1. It is initially used to define the position 3a taken up by the second box 3 below the upper box when this upper box is in position 2c. Once the two boxes 2 and 3 have been joined together and lowered to positions 2d and 3c, it is necessary to remove the joined boxes to be united. This removal is effected by lowering the stop means 49 whereupon the united boxes in positions 2d and 3c run to the right in FIG. 1 along the inclined gravity roller conveyor.

In the lowered position the roller conveyor 46 is inclined to enable the conveyor 46 to perform its function as a gravity conveyor. This is effected by tipping of the conveyor when in the lower position by two spaced apart rollers 52 mounted thereon abutting bearing surfaces 54 provided on the framework and an articulated connection between the conveyor 46 and the platform 40. Thus, as the lifting ram 41 starts to extend the lower end of the roller conveyor 46 lifts to the horizontal position and the platform 40 and roller conveyor 46 carrying the lower half moulding box then rise with the box horizontal. A longitudinal depending cam plate 57 depending from the roller conveyor 46 engages a guide surface or surfaces on the framework after the platform has started to rise as to traverse the roller conveyor 46 into a position in which the lower half moulding box is aligned with the inverted upper half moulding box suspended above it by the frame 18 and first carrier 26. As the conventional tapered pins or dowels on each box commence to enter the complementary bushes in the other box so the cam plate 57 clears the guide surface on the framework and the member 42 on the guide post passes over the frusto-conical section 45 to permit traverse and rotation respectively of the roller conveyor 46 enabling any necessary correction of the position of the lower box relative to the upper box to take place so that the lower box closes to the upper box. The lower box was stopped slightly in advance of the upper box, and has freedom to move backwards on the roller conveyor 46 to allow it to align itself in the direction of travel through the apparatus with the upper box. The upper box and first carrier are also free to traverse within limits defined by the cam plate 35 on the framework to facilitate mutual alignment of the boxes.

On completion of the upward movement of the platform a pilot valve is actuated to cause lowering of the removable stop 49 for the lower half box and operation of a further pneumatic ram carried by the platform 40 to rotate an arm 58 which engages with and pushes forward the closed boxes to a mechanical stop provided on the framework. The lugs on the top half moulding box in this way move clear of the corresponding support pads 29 and 31 on the first carrier so that the box is no longer held by the first carrier 26. Completion of lowering of the removable stop 49 actuates a further pilot valve to cause lowering of the platform lifting ram 41 so that the platform now descends carrying the closed upper and lower half boxes. As the platform approaches its lower position the aforementioned platform tipping rollers 52 engage the abutments 54 on the framework so that the platform tips and the closed boxes roll forward under the action of gravity from the roller conveyor 46 to a further section of gravity roller conveyor (not shown) provided at the discharge side of the apparatus. At the same time further pilot valves are operated in succession to cause the return of the frame 18 and first carrier 26 to the initial position in readiness to receive the next upper half moulding box.

I claim:

1. Apparatus for closing together first and second boxes as defined herein, comprising:
   (a) a framework,
   (b) a first carrier movable relative to the framework by first power operated means,
   (c) first support means for the first carrier,
   (d) means to permit transverse movement of the first carrier for relative location of the first box and the first carrier,
   (e) operating means adapted to be actuated by the first box when said first box is received in the carrier to cause said first power operated means to lift and said first carrier and the box carried thereby and rotate them so as to invert the box,
   (f) a second carrier,
   (g) second support means for the second carrier,
   (h) means to permit transverse movement of the second carrier for relative location of the second box and the second carrier,
   (i) means defining a received position of the second box in the second carrier,
   (j) further operating means actuated by the second box when it is received in the second carried to cause a second power operated means to lift the second carrier to close the second box on the first box, and
   (k) location means to locate the boxes relatively to each other as they are closed together.

2. Apparatus according to claim 1, said first support means comprising a frame movable by the first power operated means, first guide means on said second carrier adapted to be engaged by an on-coming second box, said first carrier being supported in said frame in such a manner that the first carrier can move laterally to align itself with an on-coming first box.

3. Apparatus according to claim 2 comprising cam surfaces on the framework adapted to locate the first carrier relative to the frame when the first box is moved to its inverted position.

4. Apparatus according to claim 1, said second support means comprising a platform movable by the second power operated means, second guide means on said carrier adapted to be engaged by an on-coming second box, said second carrier being supported on said platform, in such a manner that the second carrier can move laterally to align itself with an on-coming second box.

5. Apparatus as claimed in claim 4, said second carrier comprising a roller conveyor.

6. Apparatus according to claim 1, said means defining a received position of the second box in the second carrier comprising a removable stop means, the said stop means being removable to allow eventual clearance beyond said stop means of a pair of closed together boxes.

7. Apparatus as claimed in claim 4, said second carrier comprising a roller conveyor, and further comprising tipping means to tip the roller conveyor so as to facilitate gravity discharge of closed boxes therefrom when said roller conveyor is in its lowered position.

8. Apparatus according to claim 1, further comprising constraining means to constrain said second carrier against rotational movement during operation of the second power operated means to raise the second box said constraining means permitting a limited angular movement as the second box approaches the first box to allow the location means on the boxes to bring the boxes into angular alignment.

9. Apparatus according to claim 1, said first power operated means comprising two successively operable actuators, one to rotate the first box and first carrier from a generally horizontal to a generally upright position and the second to rotate the first box and its carrier from a generally upright position to a generally inverted position.

10. Apparatus according to claim 9, wherein the first actuator rotates the first box and first carrier about an axis offset from the centre of the box so as to raise the box while rotating it.

11. Apparatus according to claim 9, wherein the first actuator rotates the first box and first carrier about an axis offset from the centre of the box so as to raise the box while rotating it and wherein the second actuator rotates the first box and first carrier about an axis in the region of the centre of the box.

12. Apparatus according to claim 6 including means responsive to closure of the two boxes adapted to remove the removable stop means.

13. Apparatus according to claim 14 further comprising means for releasing the first box from the first carrier in response to closure of the boxes together so that both boxes can be lowered together by lowering the second carrier by means of the second power operated means.

References Cited

UNITED STATES PATENTS

| | | | |
|---|---|---|---|
| 3,290,767 | 12/1966 | Mamie | 29—200 X |
| 3,381,358 | 5/1968 | Eitzinger | 29—208 |

THOMAS H. EAGER, Primary Examiner

U.S. Cl. X.R.

29—200

UNITED STATES PATENT OFFICE
CERTIFICATE OF CORRECTION

Patent No. 3,538,586                    Dated November 10, 1970

Inventor(s) Henry B. Hallsworth

It is certified that error appears in the above-identified patent and that said Letters Patent are hereby corrected as shown below:

In the claims.

Claim 13, line 1 thereof, "14" should read -- 12 --.

Signed and sealed this 26th day of January 1971.

(SEAL)
Attest:

EDWARD M. FLETCHER, JR.           WILLIAM E. SCHUYLER, JR.
Attesting Officer                  Commissioner of Patents